Nov. 2, 1954
H. J. WHITE
2,693,535
APPARATUS FOR ENERGIZING ELECTRICAL
PRECIPITATORS AND THE LIKE
Filed June 18, 1948
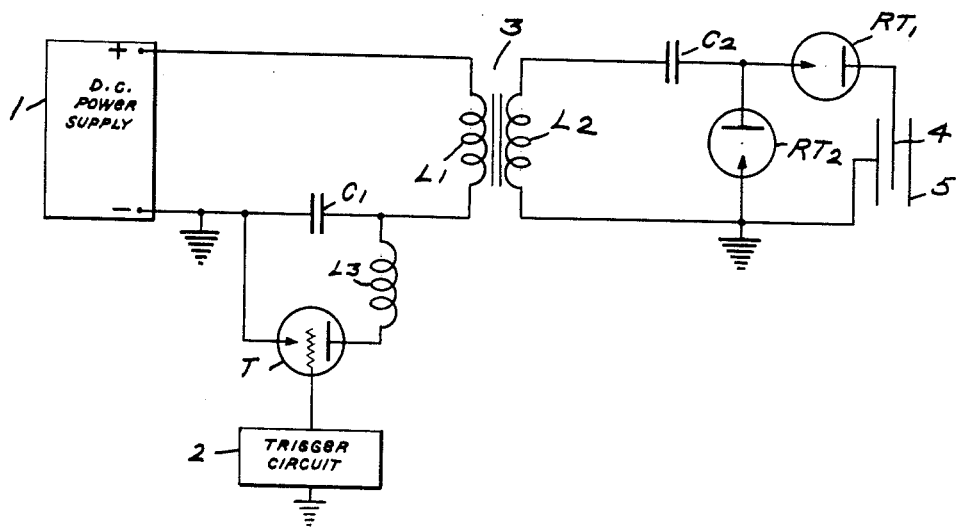
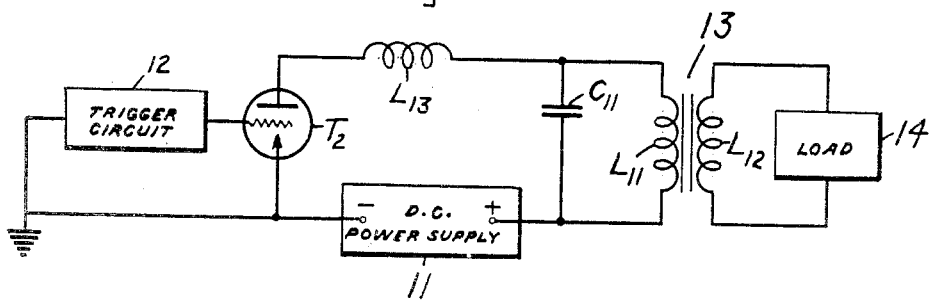
Inventor
HARRY J. WHITE
By Stowell & Evans,
Attorneys

United States Patent Office 2,693,535
Patented Nov. 2, 1954

2,693,535

APPARATUS FOR ENERGIZING ELECTRICAL PRECIPITATORS AND THE LIKE

Harry J. White, Lawrenceville, N. J., assignor to Research Corporation, New York, N. Y., a corporation of New York Application June 18, 1948, Serial No. 33,725

7 Claims. (Cl. 250—36)

This invention relates to a device for producing alternating current from a direct current source, more particularly to apparatus for energizing electrical precipitators with a high voltage, high frequency rectified alternating current converted from a direct current source.

Heretofore, practically all precipitators have been energized with rectified alternating current having a frequency of 25, 50 or 60 cycles per second, which are the frequencies of alternating current ordinarily supplied to industrial plants. Such low frequencies are convenient in that they are available directly from power supply lines without auxiliary equipment, but have the disadvantage of being much too low for optimum energization of many precipitators. Although higher frequencies can be obtained from these lower frequencies by high frequency motor-alternators, for example, the equipment required is expensive.

When 60-cycle rectified current is supplied to the usual precipitator, the required purity approximating that of direct current voltage has heretofore been obtained by employing a large capacitor, high voltage filter condenser in parallel with the precipitator electrodes. The filter condenser adversely affects precipitator operation by increasing the tendency of the precipitator to spark, increasing the intensity of such sparks, making rapid recovery of precipitator voltage difficult and causing severe electrode burning. Moreover, such high voltage filter condensers are expensive and maintenance costs are significant.

An object of the present invention is to provide apparatus for energizing electrical precipitators with high voltage, high frequency rectified alternating current. The apparatus of the invention eliminates the necessity for the employment of heavy duty filter condensers or expensive motor-alternators in the power supply system.

Another object is to provide a relatively inexpensive and efficient oscillator circuit supplying high frequency current from a relatively low voltage source of direct current to a precipitator being energized or to similar equipment. Preferably the high frequency current is rectified before being applied to the precipitator electrodes.

These and other objects of the invention, as will appear more fully hereinafter, are attained in apparatus for energizing electrical precipitators which comprises a condenser, an inductance element, a source of direct current power and a thyratron, circuit elements connecting the condenser and the inductance element to form an oscillator circuit, circuit elements connecting the condenser and the thyratron to form a continuous circuit excluding the inductance element, circuit elements serially connecting the direct current power source into one of said circuits with its negative terminal directly connected to the cathode of the thyratron and its positive terminal directly connected to one end of the inductance element, the other end of the inductance element being directly connected to the anode of the thyratron, a trigger device for periodically firing the thyratron, and a circuit for transferring power from said oscillator circuit to the electrodes of an electrical precipitator. In a typical embodiment of the invention, the power transferring circuit is inductively coupled to the oscillator circuit and includes a voltage doubling and rectifying system.

In the drawing, showing typical power circuits in accordance with the invention, Fig. 1 is a diagrammatic representation of a circuit for energizing an electrical precipitator, and Fig. 2 is a diagrammatic representation of a modified form of power circuit.

Referring to Fig. 1 of the drawing, the reference numeral 1 denotes a direct current power supply delivering, for example, 0.66 ampere at 8.4 kilovolts. The oscillator circuit includes the inductance $L_1$ and a series connected condenser $C_1$; the former may have an effective inductance value of 0.98 henry and the latter a capacitance of 0.105 microfarad and a rating of 14 kilovolts. The fundamental frequency of such a resonant circuit is approximately 500 cycles per second.

A thyratron T is connected across the condenser $C_1$ with the polarity indicated. The thyratron may have a 14 kilovolt, 10.4 ampere peak rating and may deliver an average current of only 0.66 ampere. In the external thyratron circuit a pulse choke coil $L_3$ is connected.

The pulse choke coil or inductance $L_3$ is connected into a continuous circuit including the condenser $C_1$ and the thyratron T. $L_3$ may have a value of 38.6 millihenries and forms with condenser $C_1$ a resonant circuit having a natural frequency such that the period of current pulse flow through the thyratron is approximately 200 microseconds.

The grid of the thyratron T is controlled by a trigger pulsing device 2 of conventional design that is capable of delivering accurately timed strong positive pulses of very short duration to the thyratron grid to fire the thyratron at a predetermined rate. The rate at which the trigger pulses are applied to the thyratron preferably is substantially the same as the natural frequency of oscillation of the oscillator circuit $L_1$—$C_1$, but other frequencies may be used.

The trigger pulsing device may include, for example, a variable frequency sine wave generator that feeds or controls a multivibrator circuit that produces a square wave output in a manner well known in the art. The square wave output of the multivibrator may then be differentiated by means of a condenser-resistor network. The differentiated wave having marked peaks of very short duration and alternating polarity may then be amplified, if necessary, and rectified to provide accurately timed positive pulses of extremely short duration, which pulses are fed to the grid of the thyratron to fire the latter.

It will be seen that the external circuit including the thyratron provides a regulatable shunt across the plates of condenser $C_1$ and that, by means of the trigger device, the thyratron provides a short circuit path between the condenser plates for short intervals during conductance. The value of the inductance $L_3$ is so chosen with relation to the other components of the oscillator that current flows through the thyratron for not more than about 10% of the oscillatory period of the principal oscillator circuit.

The operation of the thyratron controlled oscillator circuit thus far described will now be set forth. The series circuit including the direct current supply source 1, the inductance $L_1$ and the condenser $C_1$, in the absence of the thyratron circuit across condenser $C_1$, if subjected to a sudden surge of current as by suddenly switching on the D. C. supply source, would vibrate in a damped sine wave pattern. The oscillation thus produced would soon die out and the circuit would arrive at a steady condition wherein the voltage across the condenser $C_1$ would equal the D. C. source voltage. However, when the thyratron shunt circuit is employed, the polarity of the plates of condenser $C_1$ is periodically reversed preferably at times spaced at the natural or fundamental period of the oscillator circuit, and the oscillation of the circuit is thus sustained. Reversal of polarity in condenser $C_1$ results from the momentum given the current which flows through thyratron T, when the latter is fired, by the magnetic field set up in choke $L_3$. Without a choke in series with the thyratron, charging of the oscillator circuit is realized but in less positive manner.

Power may be drawn from the oscillator circuit by the transformer 3 in which the oscillator inductance $L_1$ forms the primary winding. The secondary transformer winding $L_2$ is loosely coupled to the primary to provide a step-up voltage ratio of 5 to 1, for example, and also to provide an effective primary leakage inductance equivalent to the value of 0.98 henry required for resonance at 500 cycles.

The output of the transformer secondary $L_2$ is fed to a voltage doubler and rectifier circuit including the voltage doubling condenser $C_2$ in series with the rectifier tube $RT_1$ and the high tension electrodes 4 of the precipitator, on one side of the circuit. The other side of the transformer secondary is connected to the extended surface or collecting electrodes 5 of the precipitator. A second rectifier tube $RT_2$ is shunted from a point between the condenser $C_2$ and the rectifier tube $RT_1$ to the other side of the circuit as shown in the figure. It will be noted that the negative side of the oscillating circuit and the positive side of the voltage doubler and rectifier circuit are both grounded.

With the arrangement illustrated, a steady voltage of 60 kilovolts may be applied to the precipitator electrodes at a power rating of about 5 kilowatts maximum.

It will thus be seen that the thyratron controlled oscillator has two resonant circuits. The first is the principal resonant circuit $L_1$—$C_1$ including the series connected D. C. power source 1. The second has the condenser $C_1$ in common with the first resonant circuit and also includes the coil $L_3$ and the thyratron for periodically completing the second resonant circuit. The second resonant circuit sustains oscillation of the first circuit by passing just enough power during periods of conduction to compensate for power losses in the first circuit and power withdrawn from the first circuit by the secondary of transformer 3. The frequency of firing the thyratron determines the operating frequency of the output of the first circuit.

The device shown in Fig. 2 differs essentially from the device of Fig. 1 in that the direct current power supply 11 is not inserted in the primary resonant circuit $L_{11}$—$C_{11}$; instead, it is inserted in the circuit including $L_{13}$, $T_2$ and $C_{11}$.

The values of the parts used in the device of Fig. 2 may fall within the same ranges as those specified for the device of Fig. 1. For example:

| | |
|---|---|
| D. C. power supply 11 | 8.4 kv.; 0.66 amps. |
| Transformer primary $L_{11}$ | 0.98 henry |
| Condenser $C_{11}$ | 0.105 mfd. |
| Pulse choke $L_{13}$ | 38.6 millihenries |
| Thyratron $T_2$ | 14 kv.; 10.4 amps. peak. |

No part of the tank circuit $L_{11}$—$C_{11}$ is grounded and the voltage across condenser $C_{11}$ swings above and below ground potential. The conventional trigger device 12 is preferably adusted to fire the thyratron at substantially the natural frequency of the tank circuit $L_{11}$—$C_{11}$, but the frequency of firing may be considerably off resonance without unduly impairing efficiency.

The secondary winding $L_{12}$ of transformer 13 is loosely coupled to the primary winding $L_{11}$ to provide the necessary primary leakage inductance and the current induced in the secondary provides power for the load 14. The secondary circuit may include a rectifier if desired.

The forms of power converters herein shown and described are merely illustrative of the invention, and variations therein will readily occur to those skilled in the art in the light of the foregoing description. It will be seen that the present invention provides apparatus for energizing electrical precipitators with high voltage, high frequency, rectified, alternating current from a direct current source of relatively low voltage. The equipment required is simple and inexpensive as compared with the much more elaborate and costly equipment heretofore generally employed for energizing precipitators with high voltage direct current.

Thyratron controlled oscillators in accordance with the present invention may be constructed to oscillate at frequencies in the audio range. A range of from 60 to 20,000 cycles may be covered by proper selection of components; the preferred range is from 300 to 8,500 cycles per second. Below about 500 cycles, a mercury filled thyratron may be employed in the shunting device. Above about 500 cycles, a hydrogen filled thyratron is preferred.

Although a loosely coupled transformer has been specifically described, it will be understood that a closely coupled transformer may be employed and the necessary oscillator circuit inductance may be provided by a separate choke coil in series with the transformer primary winding.

Optimum operating conditions require that the thyratron be fired at a rate substantially equal to the resonant frequency of the oscillator circuit. However, the rate of firing the thyratron may vary considerably from the optimum rate and yet produce a useful output. For example, the thyratron may be fired at a frequency higher than, but of the order of, the natural frequency of the circuit.

As used herein, the term "directly connected" means so connected that direct current will flow between two points so characterized.

I claim:

1. A device for producing alternating current from a direct current source particularly adapted for energizing electrical precipitators, which comprises a condenser, a transformer having a primary winding which constitutes an inductance element and a secondary winding loosely coupled thereto, a source of direct current power, and a thyratron, primary circuit elements connecting the direct current power source, the inductance element and the condenser in series to form a damped primary resonant circuit, further primary circuit elements connecting said thyratron across said condenser with the cathode of the thyratron directly connected to the negative terminal of the power supply, and a trigger device for periodically firing the thyratron, said trigger device including means for producing triggering pulses at the resonant frequency of the resonant circuit, and a secondary circuit connected directly across said secondary winding.

2. The invention according to claim 1, said secondary circuit comprising rectifying means and a load in series with said secondary winding.

3. The invention according to claim 1, including a pulse choke coil and circuit elements connecting said coil in series with the thyratron, and connecting this series combination across said condenser, said pulse choke coil and condenser forming a second resonant circuit having a much higher resonant frequency than the primary resonant circuit.

4. A device for producing alternating current from a direct current source, particularly adapted for energizing electrical precipitators, which comprises a condenser, a transformer having a primary winding which constitutes an inductance element and a secondary winding loosely coupled to said primary winding, a source of direct current power and a thyratron, primary circuit elements connecting the condenser across the inductance element to form a damped primary resonant circuit, further primary circuit elements connecting the direct power supply and the thyratron in series, with the negative terminal of the power supply connected to the cathode of the thyratron, circuit elements connecting said series arrangement across the condenser, a trigger device for periodically firing the thyratron, said trigger device including means for producing triggering pulses at the resonant frequency of the resonant circuit, and a load circuit connected directly across said secondary winding.

5. A device for producing alternating current from a direct current source particularly adapted for energizing electrical precipitators which comprises a condenser, a transformer having a primary winding and a secondary winding loosely coupled thereto, a primary resonant circuit including said primary winding and condenser as the resonant frequency-determining components, a source of direct current power connected to said condenser for charging the latter, a thyratron connected to control the charging of said condenser by said source, a trigger pulsing device for periodically firing the thyratron, said trigger device including means for producing triggering pulses at the resonant frequency of the resonant circuit, and a load circuit connected directly across said secondary winding.

6. Apparatus as defined in claim 5 wherein the cathode of said thyratron is directly connected to the negative terminal of the source of direct current.

7. Apparatus as defined in claim 5 wherein said thyratron is connected across said condenser through a pulse choke coil, said coil and condenser forming a second resonant circuit having a much higher natural frequency than said first resonant circuit.

References Cited in the file of this patent

UNITED STATES PATENTS

| Number | Name | Date |
|---|---|---|
| 1,257,978 | Chubb | Mar. 5, 1918 |
| 1,680,377 | Holden | Aug. 14, 1928 |
| 2,072,278 | Schade | Mar. 2, 1937 |

(Other references on following page)

UNITED STATES PATENTS

| Number | Name | Date |
|---|---|---|
| 2,103,090 | Plebanshi | Dec. 21, 1937 |
| 2,104,463 | Johnson et al. | Jan. 4, 1938 |
| 2,107,742 | Ruben | Feb. 8, 1938 |
| 2,233,416 | Klemperer | Mar. 4, 1941 |
| 2,352,988 | Wilcox | July 4, 1944 |
| 2,356,558 | Bahring | Aug. 22, 1944 |
| 2,406,974 | Vance | Sept. 3, 1946 |
| 2,435,414 | Sziklai et al. | Feb. 3, 1948 |
| 2,470,550 | Evans | May 17, 1949 |
| 2,484,763 | Sturm | Oct. 11, 1949 |
| 2,502,673 | Rusk | Apr. 4, 1950 |

FOREIGN PATENTS

| Number | Country | Date |
|---|---|---|
| 438,285 | Great Britain | Nov. 14, 1935 |